US011409780B2

(12) United States Patent
Tonkin et al.

(10) Patent No.: US 11,409,780 B2
(45) Date of Patent: Aug. 9, 2022

(54) SEMANTIC KNOWLEDGE BASE

(71) Applicant: SEMANTIC TECHNOLOGIES PTY LTD, North Sydney (AU)

(72) Inventors: Albert Donald Tonkin, Seaforth (AU); Dung Xuan Thi Le, Homebush (AU)

(73) Assignee: SEMANTIC TECHNOLOGIES PTY LTD, North Sydney (AU)

( * ) Notice: Subject to any disclaimer, the term of this patent is extended or adjusted under 35 U.S.C. 154(b) by 588 days.

(21) Appl. No.: 16/231,355

(22) Filed: Dec. 21, 2018

(65) Prior Publication Data

US 2019/0311003 A1   Oct. 10, 2019

Related U.S. Application Data

(63) Continuation of application No. PCT/AU2016/000096, filed on Mar. 21, 2016.

(60) Provisional application No. 62/135,560, filed on Mar. 19, 2015.

(51) Int. Cl.
| | |
|---|---|
| *G06F 16/00* | (2019.01) |
| *G06F 16/35* | (2019.01) |
| *G06F 16/93* | (2019.01) |
| *G06N 5/02* | (2006.01) |
| *G06F 40/30* | (2020.01) |
| *G06F 40/279* | (2020.01) |

(52) U.S. Cl.
CPC .......... *G06F 16/353* (2019.01); *G06F 16/93* (2019.01); *G06F 40/279* (2020.01); *G06F 40/30* (2020.01); *G06N 5/022* (2013.01)

(58) Field of Classification Search
CPC ...... G06F 16/353; G06F 16/93; G06F 40/279; G06F 40/30; G06N 5/22
USPC ......................................................... 707/740
See application file for complete search history.

(56) References Cited

U.S. PATENT DOCUMENTS

| | | | |
|---|---|---|---|
| 8,112,401 B2* | 2/2012 | Blackwood | G06F 16/93 |
| | | | 707/705 |
| 8,521,757 B1* | 8/2013 | Nanda | G06F 40/10 |
| | | | 707/758 |
| 9,411,804 B1* | 8/2016 | Kaeser | G06F 40/40 |
| 9,576,007 B1* | 2/2017 | Sivathanu | G06F 16/2228 |
| 2006/0074980 A1* | 4/2006 | Sarkar | G06F 16/958 |
| 2006/0271519 A1* | 11/2006 | Blackwood | G06F 16/93 |
| 2008/0065636 A1* | 3/2008 | Miller | G06F 16/93 |
| 2008/0313145 A1* | 12/2008 | Telesco | G06Q 20/10 |
| 2009/0276396 A1* | 11/2009 | Gorman | G06F 40/30 |
| 2011/0246461 A1* | 10/2011 | Jung | G06F 16/3344 |
| | | | 707/736 |
| 2014/0281930 A1* | 9/2014 | Liu | G06F 40/174 |
| | | | 715/243 |

* cited by examiner

*Primary Examiner* — Vincent F Boccio
(74) *Attorney, Agent, or Firm* — Honigman, LLP

(57) ABSTRACT

A system for categorising and referencing a document using an electronic processing device, wherein: the electronic o processing device reviews the content of the document to identify structures within the document; wherein the identified structures are referenced against a library of structures stored in a database; wherein the document is categorised according to the conformance of the identified structures with those of the stored library of structures; and wherein the categorised structure is added to the stored library.

27 Claims, 9 Drawing Sheets

Concept maps are updated with information from the internet. The Internet query is composed using the subject name and the ontology class

SEMANTIC KNOWLEDGE BASE

CLAIM OF PRIORITY

This application is a continuation of International Application Number PCT/AU2016/000096, filed Mar. 21, 2016, which claims the benefit of U.S. Provisional Application Number 62/135,560, each of which is incorporated by reference in its entirety.

TECHNICAL FIELD

The present invention generally relates to a method and apparatus for extracting information from a document or set of documents into a semantically accurate knowledge base.

BACKGROUND ART

Each document, reference, patent application or patent cited in this text is expressly incorporated herein in their entirety by reference, which means that it should be read and considered by the reader as part of this text. That the document, reference, patent application, or patent cited in this text is not repeated in this text is merely for reasons of conciseness.

The rapid growth of knowledge in all areas means that it is not possible for a human being to absorb and analyse data except in increasingly narrow areas of expertise. By converting this knowledge to cognitive data, much of the analysis can be automated.

For example, IBM's Watson analysed more than 70,000 scientific articles related to p53, a protein that has been linked to many cancers. Automated analysis carried out by Watson helped biologists and data scientists identify six proteins that modify p53 and that should be targeted for new research. Most important, with the use of Watson, the discovery was made in a matter of weeks, according to IBM.

More than 50 million research papers have been published, and that is doubling every three years. This rate of growth in searchable published papers is growing faster than the rate by which the data within the papers can be interpreted.

In addition to the growth in research data we have exponential growth in every other field of data, sometimes called 'Big Data'. Social communication mechanisms such as Twitter, Facebook, LinkedIn etc., generate masses of information which can be analysed. The justice system, health system, education system, manufacturing, travel, military systems and hundreds of others, all generate data at an ever increasing rate.

An objective of the present invention is to convert this information into cognitive knowledge which can be queried and analysed by computers.

This knowledge can be used by business, government, security forces and analysts of all types.

The Problem Space

Traditionally data was collected in a formalised manner, by filling in values on a screen or form, for example. The data was captured in a database which was highly structured to hold exactly the data captured in this manner. The data could be analysed by a person familiar with the structure of that data, to give information in the form of reports. The data was held in the database and the knowledge of the data was accessible by the person familiar with the structure of that data. That data familiarity could be captured in a metadata repository (by the expert) thus allowing limited automated tool access to the data.

The next major advance was data which carried its own metadata in the form of xml. This created the potential for automated tools to analyse the data based upon the metadata tags carried with the data.

Assume a collection of text information which may contain information that is needed to build and use a knowledge store.
1. Is this information relevant to my potential queries?
2. Find the information which resolves my queries.
3. Which information increases my understanding of my problem?
4. What is the information in this document about?
5. Does my understanding of the problem match the concepts in the
   document? How does it differ?

IBM's Watson, Stanford University's DeepDive and DeepQA partially address 1 and 2, partially address 3 but do not address 4 and 5.

The Solution Space

Existing methods use two techniques for determining if information is relevant to a question.
1. Understanding the information using Natural Language Processing (NLP).
2. Determining relevance statistically.

These techniques can be supplemented with Artificial Intelligence (AI) which is used to 'learn' how concepts relate. This is effectively an enhancement of the statistical technique.

Both techniques have problems of indeterminacy of meaning.

Neither technique is used in isolation of the other.

In both solutions a major problem is determining and transferring contextual and identity references (anaphora).

Other Technology Solutions

IBM Watson
1. Is this information relevant to my queries?
   If Q&A keywords match then hypothesise relevance.
   Apply algorithms to test hypotheses
2. Find information which answers my queries!
   Use Supporting Evidence Retrieval (SER)
3. Which information best answers my queries?
   Many algorithms cleverly combined
4. What is this information about?
   Not a problem addressed by DeepQA or DeepDive
5. Does my understanding of the problem match the concepts in the document?
   How does it differ?
   Requires 4 and then each item in 4 is asked of the universe of 'those claims'. Not a problem addressed by DeepQA IBM Watson describes a statistical solution as follows, where QA is Question Answering:
   "Early QA systems translated the natural-language question into a formal structured query against a precompiled knowledge database to obtain the answer.
   There are two main downsides with this approach:
      language must be precisely and completely translated into a formal representation;
      underlying structured data and schema must be suitably encoded and populated.

This doesn't work where questions are expressed using a wide variety of linguistic expressions and span a broad range of topics.

Therefore Watson employs many retrieval and scoring methods based on unstructured and structured knowledge to resolve queries and answers.

Many of these methods do not rely on any internal representation of the natural language at all but rather employ algorithms that use unstructured sources and compare natural-language statements to each other on the basis of properties of the statements themselves".

The IBM process consists of the following:
1. Analyse 'the question'
2. Generate candidate answers
3. Use evidence scoring to quantify candidates
4. Focus on 'passage scoring' i.e. the text component which contains the candidate answer keywords.
5. User SER techniques to find passages related to the candidate and provide an SER score
6. Algorithmically combine Evidence Score and SER Score to determine correctness of each hypothesis.

IBM employs the following four techniques. Each technique assigns a score:
1. Passage Term Match. By matching question terms to passage terms, regardless of grammatical relationship or word order
2. Skip-Bigram. By matching pairs of terms that are connected or nearly connected (connected skipping one other node) in the structure of the question to corresponding pairs of terms in the passage.
3. Textual Alignment. By comparing the words and word order of the passage to those of the question with the focus replaced by the candidate answer
4. Logical Form. On the basis of how well the structure of the question matches with that of the passage, aligning the focus to the candidate answer.

However, the IBM solution:
Only addresses part of the problem space.
Is statistically based rather than cognitive, hence may make cognitive errors.
Non application of anaphora resolution means that many candidates will be unrecognised.
Is not suitable for building a knowledge base.

DeepDive

Stanford Universities DeepDive product uses machine learning techniques to leverage domain-specific knowledge and incorporates user feedback to improve the quality of its analysis.

DeepDive:
computes calibrated probabilities for every assertion it makes. A fact with probability 0.9 it means the fact is 90% likely to be true;
can extract data from millions of documents, web pages, PDFs, tables, and figures;
allows developers to write simple rules that inform the inference (learning) process;
is able to use the data to learn "distantly" without training for each prediction;
is a scalable, high-performance inference and learning engine;
uses open source tools including MADlib, Impala, a product from Oracle, and low-level techniques, such as Hogwild!.

Google Knowledge Vault

The Google Knowledge Vault autonomously gathers and merges information from across the web into a single base of facts about the world, and the people and objects in it. As of 2014, it contained 1.6 billion facts which had been collated automatically from the internet. The difference between Google's existing Knowledge Graph and the Knowledge Vault is the way that facts are accumulated. The Knowledge Graph pulls in information from trusted sources like Freebase and Wikipedia, both of which are crowd sourced initiatives. The Knowledge Vault is an accumulation of facts from across the entire web. It is a mix of both high-confidence results and low-confidence or 'dirty' ones and machine learning is used to rank them.

The concept behind the Knowledge Vault was presented in a paper, *Knowledge Vault: A Web-Scale Approach to Probabilistic Knowledge Fusion* authored by Xin Luna Dong, Evgeniy Gabrilovich, Geremy Heitz, Wilko Horn, Ni Lao, Kevin Murphy, Thomas Strohmann, Shaohua Sun, Wei Zhang—all of them from Google Research.

The approach has been through various tests run by Google in other search and web products. The Official Blog Post announcing the Knowledge Graph and the transition from "Strings to Things" says that the Knowledge Graph isn't just rooted in public sources such as Freebase, Wikipedia and the CIA World Factbook. It's also augmented at a much larger scale—because we're focused on comprehensive breadth and depth".

Google has created:
Knowledge Graph; and
Knowledge Vault; and
schema.org—a collection of schema for defining objects and their attributes.

Googles Knowledge Vault contains three major components:
Extractors—these systems extract triples from a huge number of Web sources. Each extractor assigns a confidence score to an extracted triple, representing uncertainty about the identity of the relation and its corresponding arguments.
Graph-based priors—these systems learn the prior probability of each possible triple, based on triples stored in an existing Knowledge Base (KB).
Knowledge fusion—this system computes the probability of a triple being true, based on agreement between different extractors and priors.

Overall this is a system for collating and evaluating existing collated material from multiple sources. It does not have a significant semantic or cognitive component and depends heavily on confidence scoring mechanisms.

Other General Products in this Space
CIA World Fact Book;
FreeBase;
Wolfram Alpha.

Reference to cited material or information contained in the text should not be understood as a concession that the material or information was part of the common general knowledge or was known in Australia or any other country.

SUMMARY OF INVENTION

The objective of this patent is to enable the extraction of information from a set of documents into a knowledge store, in the form of highly resolved Resource Description Framework (RDF) triples using multiple ontologies to define the knowledge store.

In this context a 'document' could be anything recording information. For example:
a scientific research paper;
a newspaper article;
a medical discharge report;

a twitter conversation;
a computer blog;
a video;
an email;
a patent.

Computers have evolved from managing data to managing information and are now trying to manage knowledge. Knowledge management requires cognitive computing and natural language processing and the existence of a comprehensive knowledge model. Ontologies provide a framework for this knowledge store.

Most techniques for extracting knowledge are based on keyword search and match techniques. As such they are really information extraction techniques, containing little or no knowledge and hence unable to accurately infer any knowledge based facts.

The technique of the present invention is based on building a knowledge model based utilising ontologies. It depends heavily on Natural Language Processing (NLP) to determine the semantics and hence the meaning. Without the ability to convert the document to semantics, cognitive processing is not possible.

The success of this tool would be dependent upon the use of an efficient semantic matcher. This tool understands context specific vocabularies, for example:
 a medical vocabulary;
 a business financial services vocabulary;
 a twitter vocabulary;
 a court reporting vocabulary;
 a medical diagnosis vocabulary;
 emails;
 etcetera.

The semantic matcher achieves understanding by transforming words, phrases and multi-words (e.g. myocardial infarction) into RDF triples. Thus the meaning of 'Prime Minister' would have a set of RDF triples such as (pseudo RDF):
 Person has role of minister;
 PM leads a political party;
 Political party forms a government;
 Government is of a nation;
 PM is elected;
 Elected by party representatives;
 Representatives elected by universal franchise.

These relationships would also be described in an ontology of government, with the specific subtype of government being the 'Westminster Government'.

In order to provide the answer to a question it is necessary to take the concepts imbedded in the question and search for matching concepts in the available media.

Example 1—Who is the Prime Minister of Australia?

Using a statistical, keyword based technique. Keywords 'Prime Minister' and 'Australia'.
 Find the documents which have the most hits on the keywords. This could include many millions of documents (in the order of 123,000,000 through a Google search conducted in 2015 including all 28 PMs).
 Determine statistical probability of correct answer based upon the number of keywords matched in each document. Sequence the documents based upon match quality.
 Manually browse each document to see if it provides the knowledge required.
Using our technique=Knowledge based:
 Parse the question to determine the semantics. This will resolve the entity types in question:
  The verb 'is' implies 'who is the current Prime Minister'
  The subject and predicate of the query 'who' and 'is' can be translated semantically to 'what is the name of
  Prime Minister: Entity type=personal Role, which is a sub-class of Person (Person has data property name)
  Australia: Entity type=Country subclass of Nation which has a data property of 'leader of government' and 'title of leader'='Prime Minister'
 Check if answer already in knowledge base. If answer not available continue.
 Find the documents which have the most hits on the keywords 'Prime Minister' and 'Australia'. This search could be semantically enhanced by using the word 'current'.
 Parse the documents into RDF triples and determine entity types.
 Use knowledge of the Entity types in each document to incrementally build knowledge base:
  Prime Minister: Entity type=personal Role, Person (Person has name)
  Australia: Entity type=Country, Nation (Has a Prime Minister)
 Info Requested: Name of PM of Australia.
 Get exact answer or near exact answer.

The present invention seeks to obtain an understanding of the objective and contents of the documents being examined, in a manner which allows inferences to be drawn, understood, and related between documents.

In a first aspect, the present invention seeks to provide a system for categorising and referencing a document using an electronic processing device,
 wherein the electronic processing device reviews the content of the document to identify structures within the document;
 wherein the identified structures are referenced against a library of structures stored in a database;
 wherein the document is categorised according to the conformance of the identified structures with those of the stored library of structures; and
 wherein the categorised structure is added to the stored library.

Preferably, elements of the identified structure are referenced through Natural Language Processing.

Preferably, when there is no conformance between the identified structure and the stored library of structures the system searches through documents in an external network for structures that match the identified structure.

Preferably, a searchable reference is associated with the document and linked to the document.

In a second aspect, the present invention seeks to provide a system for arranging text and extracting information from the text using an electronic processing device;
 wherein the system scans the text and assigns it a classification; and
 wherein on assigning the classification the system associates a template to the text based on the classification.

Preferably, the template separates the text into distinct sections.

Preferably, each distinct section is assigned a subject, an object and a predicate.

Preferably, the subject, object and predicate are grouped in a resource description framework.

In a third aspect, the present invention seeks to provide an electronic system for classifying the content of text wherein the system reviews the text and assigns different regions of the text a primary subject, a primary object and a primary predicate and stores the assignment as a resource description framework.

Preferably, the different regions of text are reviewed and further allocated at least one additional subject, at least one additional object and at least one additional predicate.

In a fourth aspect, the present invention seeks to provide a system for categorising and referencing the contents of a document using an electronic processing device, wherein the electronic processing device reviews the contents of the documents and identifies the expression of at least one concept within the document; and wherein the identified expression of the at least one concept is assigned a searchable resource description framework.

Preferably, the searchable resource description framework consists of a subject, predicate and object in a resource description framework triplet.

Preferably, a plurality of resource description framework triplets are associated with the contents of the document.

Preferably, if a non-specifically identifying subject, object or predicate is used within a first resource description framework an anaphora is applied to the surrounding resource description frameworks to identify the non-specifically identifying subject, object or predicate.

Preferably, if a subordinate conjunction appears first in the resource description framework followed by a personal pronoun and then a dependent clause, the system will associate the non-specifically identifying subject, object or predicate with the corresponding subject, object or predicate in the following resource description frameworks.

In a fifth aspect, the present invention seeks to provide a method for configuring data for storage in a knowledge base, the method comprising:

providing an electronic document having document type attributes;

capturing the document type attributes in a template that is based on an ontology language;

based upon the capturing by the template, defining a structure of the document determined by document type attributes to generate a defined structure as output; and storing the defined structure for further processing.

Preferably, the document further comprises base concepts, the further comprising based upon the capturing by the template:

defining base concepts and generating base concepts as output; and storing the base concepts for further processing.

Preferably, the method further comprises:

arranging the defined structure and base concepts into concept maps based upon the ontology language; and storing the concept maps in a knowledge base.

Preferably, a base concept is either explicit or implicit and when the base concept is an implicit concept, the method further comprises accessing external resources via the Internet to transform an implicit base concept into an explicit base concept.

Preferably, the method further comprises defining a sub-structure of the document based upon the sub-structure being captured by a sub-structure template.

Preferably, the method further comprises building a template to capture the document type attributes.

Preferably, the method further comprises generating a conformance report to generate validation output as to the use of a particular template with a particular document.

In a sixth aspect, the present invention seeks to provide a method of configuring data for storage in a knowledge base, the method comprising:

providing an electronic document having contextual properties;

expressing the contextual properties as resource description framework units representative of a subject, an object and a predicate;

arranging the resource description framework units so that the contextual properties can be referenced between two or more resource description framework unit to generate arranged resource description framework units;

performing anaphoric resolution between the arranged resource description framework units to generate one or more resource description framework units concepts from the resource description framework units; and storing the resource description framework concepts into concept maps based upon an ontology language for further processing.

Preferably, the method further comprises storing the concept maps in a knowledge base.

Preferably, a resource description framework concept is either explicit or implicit and when the resource description framework concept is an implicit resource description framework concept, the method further comprises accessing external resources via the Internet to transform a resource description framework implicit concept into a resource description framework explicit concept.

Preferably, the method further comprises merging base concepts and resource description framework concepts to form merged concepts wherein a merged concept is either explicit or implicit and when the merged concept is an implicit merged concept, the method further comprises:

accessing external resources via the Internet to transform an implicit merged concept into an explicit merged concept; and storing explicit merged concepts in knowledge base.

Preferably, the method further comprises merging the defined structure and resource description framework concepts to form merged concepts wherein a merged concept is either explicit or implicit and when the merged concept is an implicit merged concept, the method further comprises:

accessing external resources via the Internet to transform an implicit merged concept into an explicit merged concept; and storing explicit merged concepts in knowledge base.

Preferably, the method further comprises querying the knowledge base to retrieve an explicit merged concept.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

In the drawings like structures are referred to by like numerals throughout the several views. The drawings shown are not necessarily to scale, with emphasis instead generally being placed upon illustrating the principles of the present invention.

DESCRIPTION OF EMBODIMENTS

Figure 1:
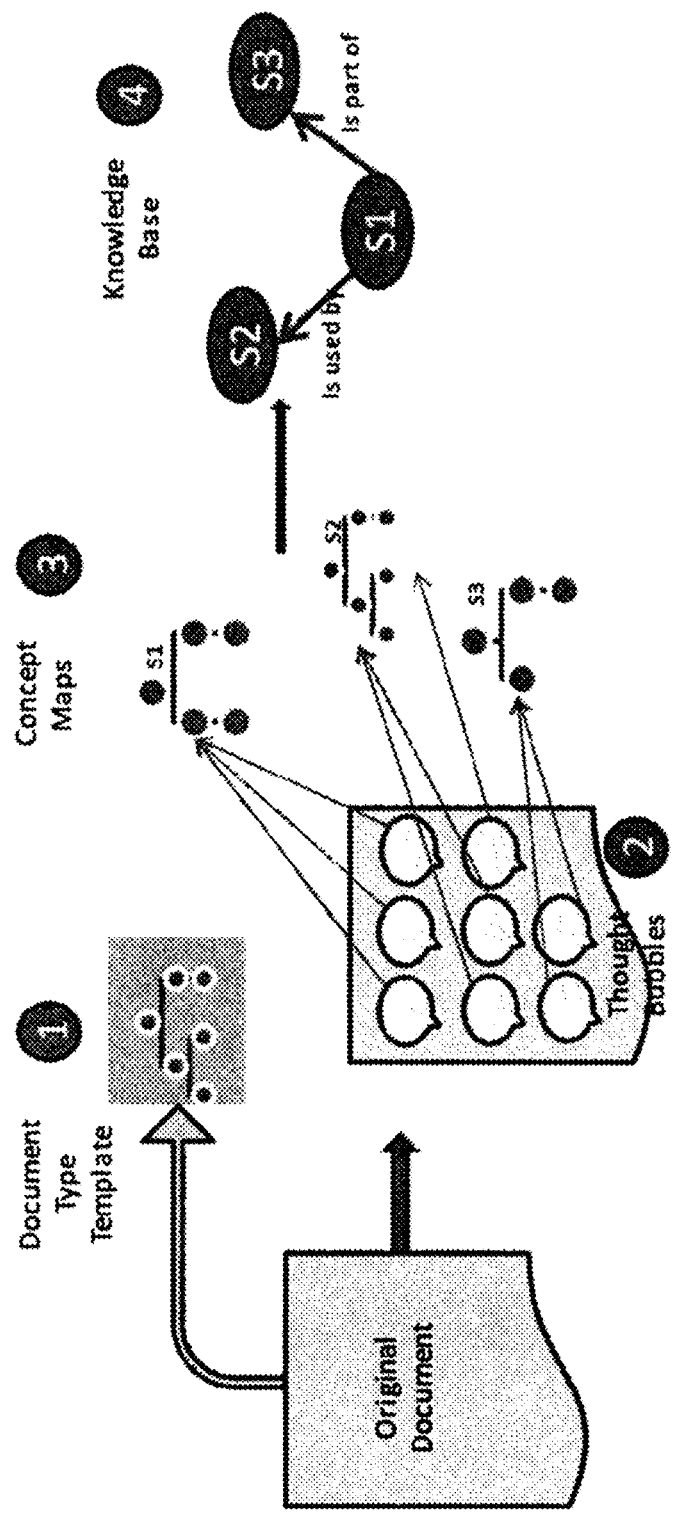
FIG. 1 is a Diagram of Components used in Knowledge Extractor.

Computers have evolved from managing data to managing information and are now trying to manage knowledge. Knowledge management requires cognitive computing and natural language processing and the existence of a comprehensive knowledge model. Ontologies provide a framework for this knowledge model and RDF provides a model to store the data.

Most techniques for extracting knowledge are based on keyword search and match techniques. As such they are actually information extraction techniques, containing little or no knowledge, no cognitive understanding and hence unable to infer any knowledge based facts.

The exponential growth of knowledge in all areas means that it is not possible for a human being to absorb and analyse data except in increasingly narrow areas of expertise. By converting this knowledge to cognitive data, much of the analysis can be automated.

More than 50 million research papers have been published, and that is doubling every three years "not only are our databases growing; they are growing faster than we can interpret all the data that they contain", says Dr. Olivier Lichtarge, a computational biologist and professor of molecular and human genetics at Baylor Med.

In addition to the growth in research data we have exponential growth in every other field of data, sometimes called 'Big Data'. Social communication mechanisms such as Twitter, Facebook, LinkedIn etcetera, generate masses of information which can be analysed. The justice system, health system, education system, manufacturing, travel, military systems and hundreds of others, all generate data at an ever increasing rate.

The objective of this toolset is to convert this information into cognitive knowledge which can be queried and analysed by computers.

The technique is based on building a knowledge model based utilising ontologies. It recognises that every document uses a vocabulary specific to the type of document. For example a scientific paper on diabetes, uses a different vocabulary to a newspaper report of a football game and to a hospital patient discharge report. For each document type the structure of the document can be broadly defined in terms of the roles of the subjects, the types of subjects, the types of artefacts, or events recorded. Document types always include specific components, such as an 'Abstract', a 'Conclusion', an 'Event description', an 'Author', a 'Reporter' and so forth.

The document type attributes can be captured in a Document Type Template (DTT) written in an ontology language such as Web Ontology Language (OWL) to describe the concepts and structure of documents of a particular type. These ontologies define information using semantic terminology which can be 'understood' by a computer.

Each of the concepts in the template and other concepts in the document itself can also be defined as OWL ontologies. For example a football player is a person who has the role of footballer. Ontologies for these two concepts exist and can be used as a framework for capturing details from the document in semantic terms.

As the document is read, the sentences are converted to RDF triples using Natural Language Processing (NLP), and the concepts are extracted by using subject typing as per the SSAP semantic matcher. Thus the phrase "right winger Jones scored an own goal" would have a completely different meaning in a football report and a political commentary. In the case of a football report Jones is a person (concept with attribute name=jones) playing football (activity concept with position=winger, objective=scoring goals, no own goals). In a political report Jones is a person (concept with attribute name=jones) supporting right wing politics (ideology with type=right wing) who performed an act (activity concept, type unknown) which damaged his reputation (own goal).

Technical Overview

The process and tool described in this patent is a 'Knowledge Extractor' (KnowExt) and is a stand-alone process or tool.

It uses Natural Language Processing (NLP) in a sophisticated manner.

The NLP is typically performed sentence by sentence.

The context of one sentence frequently is implied in following sentences allowing the resolution of references between sentences. Such references are called anaphors. Resolving these references is called 'anaphor resolution'.

For example, Tom climbed the Matterhorn. He used spurs (to climb the mountain).

'He' resolves to 'Tom' and 'the mountain' resolves to 'the Matterhorn'.

A paragraph is used to describe and elaborate upon an aspect of a single concept or event.

Frequently context is determined by a previous paragraph or sentence or title etcetera.

For example, from there, our hero could see all Switzerland. 'There' is 'the Matterhorn' and 'Our hero' is 'Tom', both resolved from a previous paragraph.

Contextual information may also be determined by the source document type (e.g. scientific paper, political article etc.).

NLP is transformed to RDF graphs in which anaphors have been resolved.

The process can be summarised as follows:

Identifying, manipulating and populating the concepts from a document in a machine readable manner (RDF).

Identifying and resolving contextual references.

Finding and organising implicit information.

Understanding and validating relationships between concepts.

Managing the scope of information explicitly and implicitly available.

Producing a reusable framework to capture the information extracted (Such as Knowledge Vault).

Machine learning techniques can be applied to each of these processes. The application of Deep Learning techniques allows the use of multiple contexts to be evaluated simultaneously and the detection and minimisation of noise words. The difference between Deep learning as normally applied to NLP is that a specific deep learning context is available in terms of the various context specific templates being used (DTT, Concept Maps (CM) and Thought Bubbles (TB)).

Similar Concepts

Googles Knowledge Vault is the most similar concept, however the construction methods are different and the scale and granularity are also different.

The present invention consists of a database of concepts, their meaning and relationships between them defined as ontologies. Data instances are created using the meanings captured in the ontologies.

The present invention assumes that all data has structure, even if that structure is only partially known. The structure may be explicit as in a Relational Database Management System (RDBMS), or implicit as in a scientific report.

With reference to FIGS. 1 to 9, the present invention solution is a cognitive solution based on conversion of text from an original document 05 to RDF using NLP. It has four components which address NLP problems through these new techniques:

Document Type Templates (DTT) 01—Defines the high level data structure of the source documents 05

Thought Bubbles (TB) 02—Capture the concepts in each paragraph of data and extract the entity types from the data Concept Maps (CM) or Micro-Vaults (MV) 03—Pre-constructed ontologies based upon entity types.

Knowledge Base (KB) 04—The transcribed content of the document with all data related to the CMs 03 and the CMs 03 related using information from the source document.

The CM's 03 and KB 04 together create a knowledge vault which can be created from scratch and updated as new information becomes available.

Associated with each of the templates mentioned above is a set of template specific ontologies. Any Device or Event identified in these ontologies has a set of associated time components. In the case of an 'event', an exact time may be known. In the case of a future event whose time is unknown, the time may be captured as after the publication date of the article in which it was mentioned. In the case of a historic event whose time is unknown, the time may be captured as before the publication date of the article in which it was mentioned. Events may be automatically time-lined based upon information in the article.

Sometimes may be assigned by period or era, For example, 'the middle ages', 'the Jurassic' and so forth. For some objects there may be dates such as 'Blunderbuss 1600-1800', 'IPad 2000'. All objects and events are initially assigned a date of 'Unknown'. This date is progressively refined using information and inferences from the document and the web.

The time associated with an object or event has both type and value. Some illustrative types and values are shown:
Actual time as in UTC or GMT.
Approximate time we may make assumptions:
10:00-this day;
Date-this century;
Circa.
Relative time:
Before or after another event.
Shortly before, long before. Relate to lifespan of principal class e.g. shortly before Elijah was born implies less than one lifetime of 70 years. Long before Elijah was born suggests more than one lifetime of 70 years.
Geological time.
Astronomical Time.
Time anomaly-either an error or science fiction.

The relationship between the components is shown in FIG. 1.

We now examine these components in detail.

Part 1—Document Type Templates

A 'DTT 01 is an ontology based on the type of document source 05, for example:
Scientific paper;
News article;
Discharge document;
Pathology Report;
Sensor input;
Social media:
Twitter;
Facebook;
LinkedIn;
Emails;
Patents;
Etcetera.

The DTT 01 specifies the major concepts or classes to be found in a document 05 of a particular type. Each concept is related to an initial set of data properties, also set by the type template. The list of classes could be initialised from schema.org for example, or by various methods described below.

The DTT 01 typically contains subtype templates. For example a scientific paper typically contains:
Authors;
Abstract;
Findings;
Chapters;
Conclusion;
Bibliography Many of these subtype templates would be shared between different DTTs 01.

There are axioms specific to a particular DTT 01. For example, it is axiomatic that concepts referenced in the 'Abstract' must also appear in the 'Findings' and in the 'Conclusion' of a scientific paper.

The DTT 01 is a document type specific ontology which is used to create data property instances from the input document(s). Data acquired from the document is termed 'Explicit data'.

The DTT 01 data properties may optionally be updated with data properties from other sources 07 such as DBPedia/Wikipedia. Related data acquired from outside the document is termed 'Implicit data' or 'Inferred Data'. For example the text "Tom climbed the Matterhorn" would result in the Object 'Matterhorn' a proper noun being explicitly defined. 'Tom' and the 'Matterhorn' would obtain their URI from the URI of the document in which they were defined.

'Tom' is a proper noun which is the name of a person 'climbed the Matterhorn' is an Event. The Event consists of the Activity 'climb', 'Person', 'Event' and Activity are concepts for which a Concept Map would exist as an ontology.

The fact that the 'Matterhorn' is a mountain in Switzerland is implicit data which could be determined by a Wikipedia search. 'Switzerland' is a location with a massive amount of implicit data. A 'mountain' also has a number of data properties which can be implicitly included and updated with data properties specific to the 'Matterhorn' (height, max/min temperature, geolocation, type of rock, etc.). This implicit data would obtain its URI from its source 07, viz., Wikipedia or DBPedia.

Figure 2:
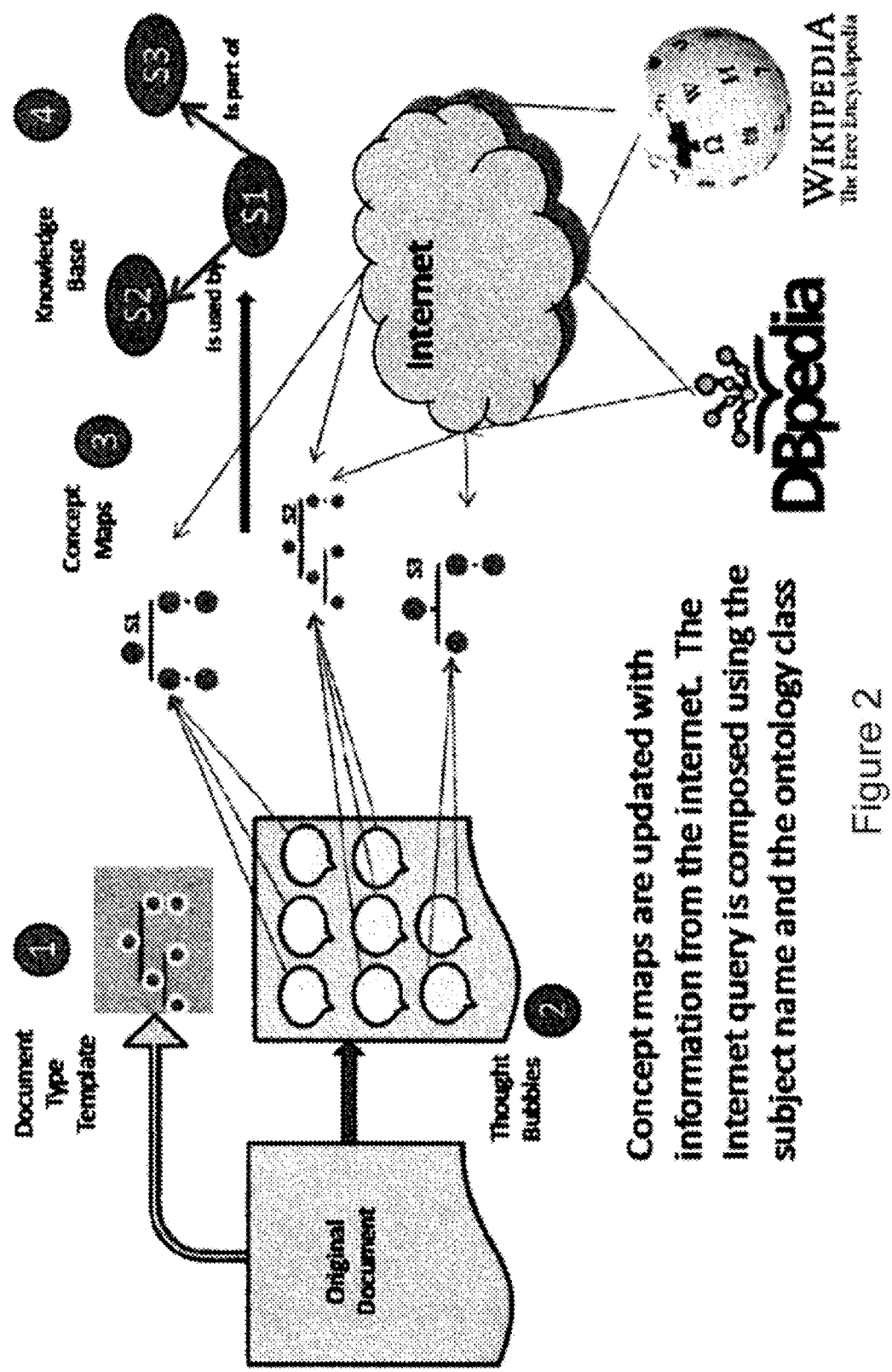
FIG. 2 is a Diagram of Using external sources to add implicit detail.
Figure 3:
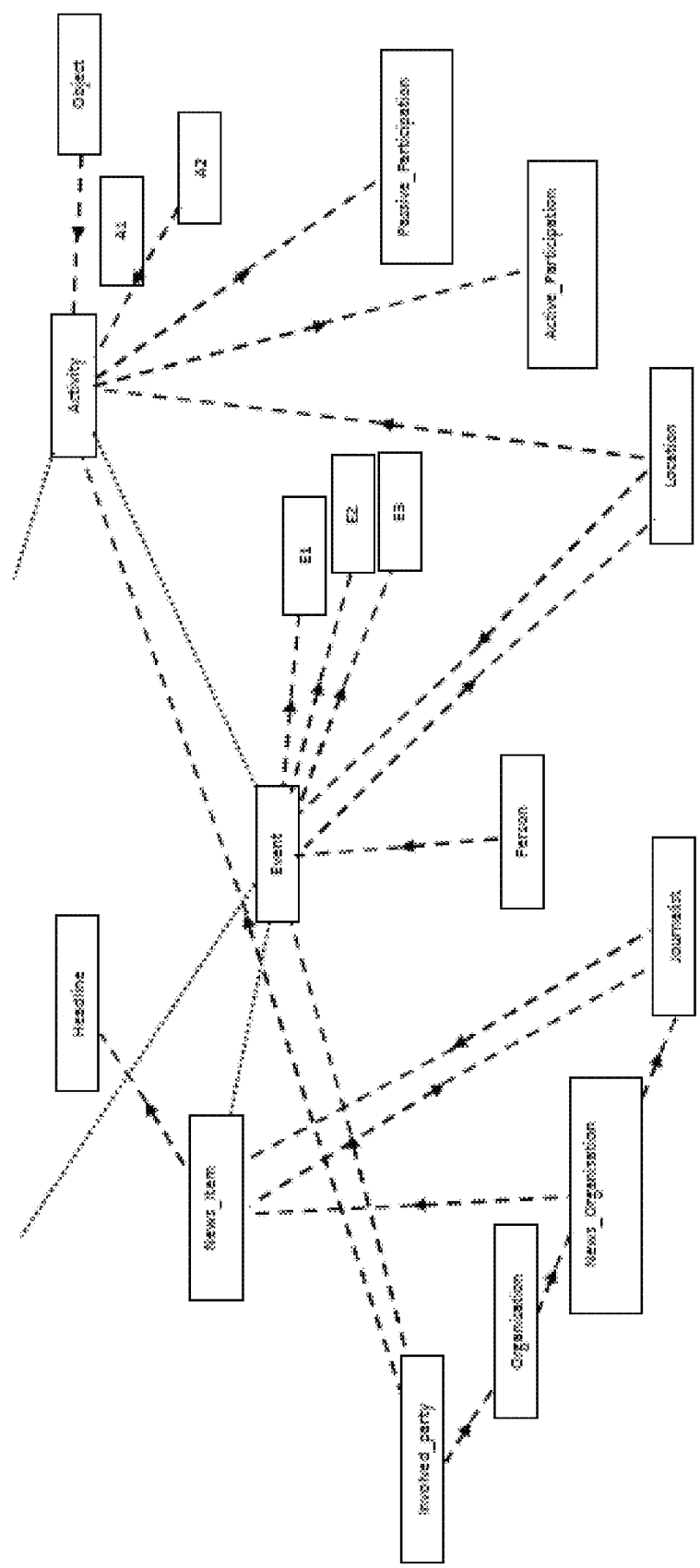
FIG. 3 is a Diagram of Some components of a News Report DTT shown as an ontology.

The acquisition of implicit data is shown diagrammatically in FIG. 2.

The DTT 01 forms part of a pre-constructed knowledge-base framework. It may be created by a user to resolve any new document type. It can use some subtype DTTs 01 which may be shared across DTTs 01.

Ideally the DTT 01 would be created using tool assistance and/or AI. For example, by performing deep indexing of newspaper articles it would be possible to determine that there are categories of newspaper articles such as:
Political:
  Local;
  National;
  International;
Sport;
Fashion;
Education;
Entertainment.

Each of these categories results in a sub-type of the 'Newspaper Article' template. The main subject of a political report would be:
Politicians;
Governments.

An illustrative DTT 01 for publications including News Reports 15 is shown in Appendix A. A small sample of some of the concepts used in a News Report 15 is shown diagrammatically in FIG. 3. It shows that a News Item 17 consists of a Headline 19 and an Event 21. The Event 21 can consist of many Events 45, 47, 49 Activities 25, 27, 29, utilising objects 30, and with active 31 and passive 33 participants. It also shows that News Item 17 originated through a journalist 18 and News Organisation 20 as an organisation 41 and involved party 43. It also shows that the event 21 took place at a location 51 and involved a person 53.

Figure 4:
FIG. 4 is a screen shot Sample of a Twitter document at twitter.com/TEDTalks/status/5699 . . .
Figure 5:
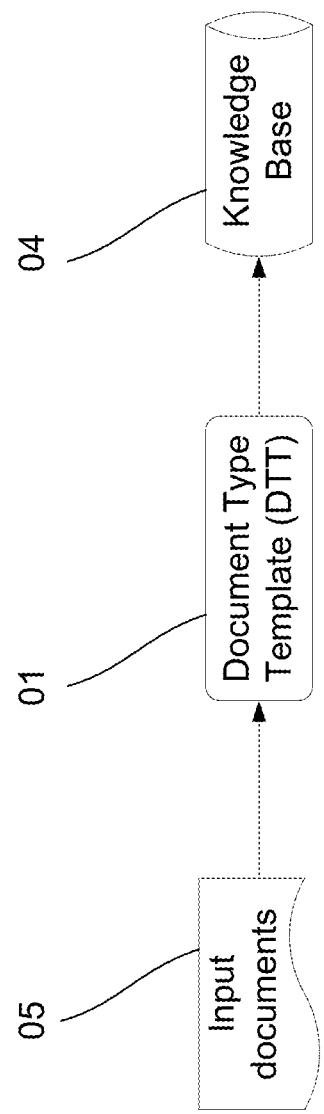
FIG. 5 is a flow chart illustrating Extracting Knowledge through Document Type Template only.
Figure 6:
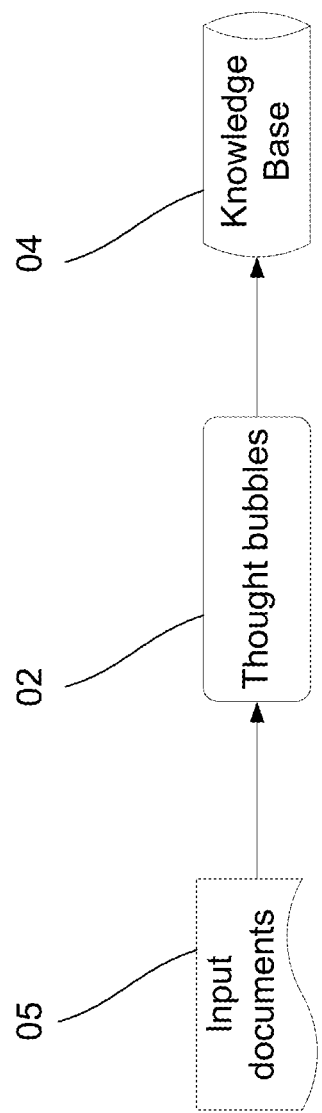
FIG. 6 is a flow chart illustrating Extracting Knowledge through Thought Bubbles Only.
Figure 7:
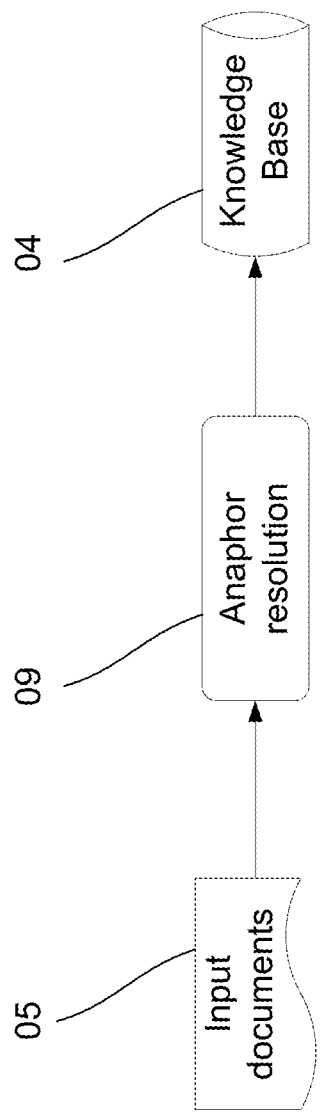
FIG. 7 is a flow chart illustrating Extracting Knowledge through Anaphor Resolution Only.

The DTT 01 also determines many of the Uniform Resource Identifiers (URIs) associated with the document (see FIG. 4). The URI for the document is plain. The 'Title' can be extracted from the first tweet in the conversation. Each tweet defines a paragraph or 'thought bubble' 05, 07, 09 in our terminology.

A cursory examination of FIG. 4, providing an example of a twitter dialogue 55, would enable most of the components of a suitable DTT 01 to be designed. For example the title could be extracted from the first entry 23.

A DTT conformance report can be produced to validate the use of a particular DTT 01 with a particular document. For example:
Bibliography missing;
Oldest and newest reference in Bibliography.

Part 2—Thought Bubbles

If a document is considered a 'body' of knowledge, then each paragraph in the document is like an 'organ' in that body. Or to use another analogy, a 'Thought Bubble' (TB) 02 is a 'molecule of information' composed of 'atoms' which correspond to RDF statements. In a Twitter conversation each 'Tweet' would be a TB 02.

The Thought Bubble has contextual properties expressed as RDF triples. Each TB 02 or paragraph will contain a main:
Subject (s);
Object (p);
Predicate (o); and
Numerous subordinate s, p, o's.

TB's 02 are generally arranged linearly as in the original document. IE TBs 02 can be numbered and arranged hierarchically. In more complex documents such as Twitter conversations the arrangement may resemble a network rather than a linear sequence. However, even as a network the TB's 02 are sequenced. This is important to allow references from one TB 02 to be passed to another TB 02 for anaphor resolution.

TBs can inherit contextual properties from the previous TBs 02 through the use of anaphora analysis.

Typically a TB 02 will correspond to a paragraph from the source document. Other sources are:
Chapter/Section headings
Captions
Tweets
Figures
Tables
. . .

Within a TB 02 contextual properties allow us to:
Use NLP to perform named entity recognition, to create and reify RDF triples and produce an RDF graph of the text.
Apply a template based on the type and subtype of the source document.
  For example, Scientific paper, News article, Discharge report, etc.
  Template may assume language constructs, vocabulary context etc.
Infer the appropriate RDF subject in each ambiguous reference. For example, Tom, He, Our hero.
  If all references are ambiguous then attempt to infer subject from previous TB or from information captured in the DTT 01
Extract and classify each unambiguous subject and object from the TB 02 into individual, ontology based Concept Maps (CM) 03.

The processing of a TB 02 will be specific to the type of TB 02. For example a table with headings and columns will relate the column entries to the column headings. The main s p o will be inherited from the caption, and the subordinate s,p,o's from the column headings and the column entries. Resolving these relationships is a form of anaphora.

Anaphora

Broadly, Anaphora is any linguistic referencing. In the context of the Knowledge Extractor (KE), see below, this referencing is extended to include various forms of document components such as tables, figures, captions etcetera.

Three types are identified:
1. Endophora-Forward referencing.
2. Cataphora-Backward referencing.
3. Exophora-Situational referencing.

Simple examples follow. In reality references can be separated by many sentences or paragraphs.

Endophora
  The anaphor appears after the referenced item.
  Susan dropped the plate. It shattered loudly—the pronoun it is an anaphor; it points to the left toward its antecedent the plate. (Also note Object to Subject transfer).
  The music stopped, and that upset everyone—the demonstrative pronoun that is an anaphor; it points to the left toward its antecedent The music stopped. (Note first sentence reified).
  Fred was angry, and so was I—the adverb so is an anaphor; it points to the left toward its antecedent angry. (Also note Subject Object inversion).

If Sam buys a new bike, I will do it as well—the verb phrase (or predicate) do it is anaphor; it points to the left toward its antecedent buys a new bike.

A related form of endophora is relating the contents of a column in a table to the heading of that column.

Cataphora

The anaphor appears before the referenced item.

Because he was cold, David put on his coat—the pronoun he is a cataphor; it points to the right toward its postcedent David. (Complex reification of first phrase is required to manage 'because').

His friends have been criticising Jim for exaggerating—the possessive adjective his is a cataphor; it points to the right toward its postcedent Jim.

Although Sam might do so, I will not buy a new bike—the verb phrase do so is a cataphor; it points to the right toward its postcedent buy a new bike. (Complex reification of both phrases is required to manage 'although').

In their free time, the kids play video games—the possessive adjective 'their' is a cataphor; it points to the right toward its postcedent the kids.

A related form of cataphora is relating the caption of a figure or table to its contents.

Exophora

Exophoric reference occurs when an expression refers to something that is not directly present in the linguistic context, but in the situational context. TBs are especially useful in resolving exophors. Deictic proforms are stereotypical exophors, for example:

This hose is better than that one. The demonstrative adjectives this and that are exophors; they point to entities in the situational context.

Jerry is standing over there. The adverb there is an exophor; it points to a location in the situational context.

Part 3—Concept Maps

A 'Concept Map' (CM) 03 is a bit like a subset of Googles Knowledge graph, created or supplemented by the source text being analysed. It is a small ontology detailing all the properties associated with a particular concept.

Each CM 03 is a collection of mini ontologies such as Person, Event, Activity.

CM 03 has ontology template based on subject/object type e.g. as determined by Schema.org:
  Person;
  Event;
  Location;
  Device.
  Possible relationships between named entity types are prescribed (see YAGO-1 00,000 types and their relationships). For example a person cannot 'sing' a mountain.
  CM's 03 initial set of data properties set by subject/object type template.
  Update the CM 03 with data properties from the TBs 02 (Explicit data).
  Optionally update the CM 03 with data properties from other sources 07 e.g. Dbpedia, Wikipedia (Implicit data).

This example shows the more common high level properties associated with a Person.

Person
  Identifiers
    Name
    Social Security Number
    Date of birth
    Father
    Mother
  Physical Properties
    Structure
      Limbs
      Organs
    Senses
      Sight
      Smell
  Activities
    Natural
      Walk
      Eat
      Run
    Assisted (denotes an object which would have its own CM 03)
      Fly-Aeroplane, Kite
      Drive-Car, boat, golf ball
      Shoot-Weapon, camera
    Abstract
      Work
      Play
  Relationships
    People
      Marriage
      Genealogical
      Work
    Objects
      Own
      Use Part 4—Knowledge Base Introduce the concept of a 'Knowledge Bases' (KB) 04 graph.

KB 04 is RDF graph based on the relationships between the CMs 03 identified by NLP analysis of the document. For example:
  DTT 01 type=Scientific paper
  DTT 01 components: Title: 'Computing Minimal Mappings', Authors: 'Jones', Abstract: ' . . . ', Conclusion: ' . . . '.
  TBs 02 Text converted to RDF and anaphors resolved
  CM's 03 Ontologies, minimal mappings, redundant mappings populated with details from TBs . . . .
  KB 04: An ontology has many mappings; some mappings are redundant; a minimal mapping has no redundant mappings; . . .

The relationships are determined by the TBs 02.

The Object properties of the KB 04 can be validated against the CM 03 properties referenced.
  For example, the Matterhorn is a mountain. Mountains can be climbed. Mountain climbers use crampons. This is not consistent with the data implicit in the CMs. If the sentence had read 'He used crampons', then the sentence would have been consistent. Spurs are used to climb trees, not mountains.

After the various components (DTTs 01, CMs 03, TBs 02) have been assembled into a raw Knowledge Base 04 a number of processes are performed to refine the result. These include:
  Ambiguity reduction. For example is 'Tom' in chapter 6, 'Tom Jones' or 'Tom Brown', Are Liz and Lisa the same person?
  Duplicate reduction. Often an entity is identified as a new entity even though it has been previously identified with the same name.

Time determination. Examine related events to more accurately determine times. This typically requires several iterations.

Validate implicit information based upon refined data.

Update URIs to reflect source as explicit, implicit or inferred from one or both explicit and implicit sources.

Update provenance information.

Load into the final version of Knowledge Base.

SSAP Solution Space Map
1. Is this information relevant to my query?
   Do the CM's 03 map?
   Does the KB 04 map?
   Does the KB 04 contain information not in the query?
2. Find information which answers my query!
   As above
3. Which information best answers my query?
   Scoring technique based on CM's 03 an KB's 04
4. What is this information about?
   CMs 03 and DCs
5. Do these claims match those claims?
   As for 1.

What the Knowledge Extractor Does

The major use of the Knowledge Extractor (KE) is in building a KB 04 or knowledge vault (KV). As each document is read the appropriate components of the knowledge vault are updated. The KV could be topic specific, such as diabetes, or it could cover a range of topics, or even all topics as per the Google KV.

The KE is a tool which:
Extracts information from unstructured sources and transforms the information into knowledge in a controlled and consistent manner.

Resolves internal references in the source documents through the use of its artefacts and processes.

Transforms information into knowledge using the vocabulary and concepts of the subject area.

Identifies concepts within a document and:
   Identifies the attributes of those concepts as defined in the document.
   Optionally adds additional attributes by using external sources on the www.
   Identifies relationships between the concepts identified in the document.

Compares the knowledge identified with existing knowledge allowing the differences to be highlighted.

Resolves language and dialect differences to determine a language neutral definition of the concepts in a document.

Creates a comprehensive knowledge base from the documents analysed. This knowledge base can be queried and manipulated using the SPARQL query language. Using SPARQL against the knowledge base it becomes possible to ask detailed and complex queries.

As such, the KE can be used for the following types of knowledge management.

Research—by collating and classifying knowledge in many research papers new knowledge can be gained.

Profiling—by collating disparate forms of social media a person or organisation can be profiled. For example, information from Facebook, Twitter, LinkedIn and other social media sources can be combined and transformed into a single vocabulary. This is information of use to Call Centres, Telcos, Banks and any large customer facing organisation.

Forensic analysis—by analysing all links to an event described in Twitter or Facebook etc., a comprehensive picture of an event can be obtained. See the Steubenville case.

Security—detection of terrorism, illegal immigration, and all other aspects of homeland security can be improved.

Technological advances can be evaluated by extracting the knowledge from industry journals, scientific paper, manufacturers white papers etc.

FIG. 5 to FIG. 9 illustrate some of the ways in which the various components may be used individually or combined to create a knowledge base.

Using the DTT 01 only will result in a consistent knowledge framework for all documents with the various concepts consistently defined and URIs assigned (see section "Function_1: Document Type Template (DTT) 01 Processing" below for further explanation). Although all details of the input document would not have been analysed in full detail, the major subjects and context would be available and loaded into the KB 04.

Using TBs 04, only a complete set of RDF triples may be extracted but because there has been no anaphor resolution 09 the triples will contain many blank nodes and consequently much of the meaning will be irretrievable. However, the main subject, object and predicate of each bubble will have been identified, plus some supporting information (see section "Function_2: Thought Bubbles (TB) Processing" below for a detailed explanation.

Anaphor resolution 09 applied alone would resolve anaphors within a TB 02 but would not be able to resolve anaphors across TVs 02 (see section "Function_3: Anaphor Resolution" for a detailed explanation).

Figure 8:
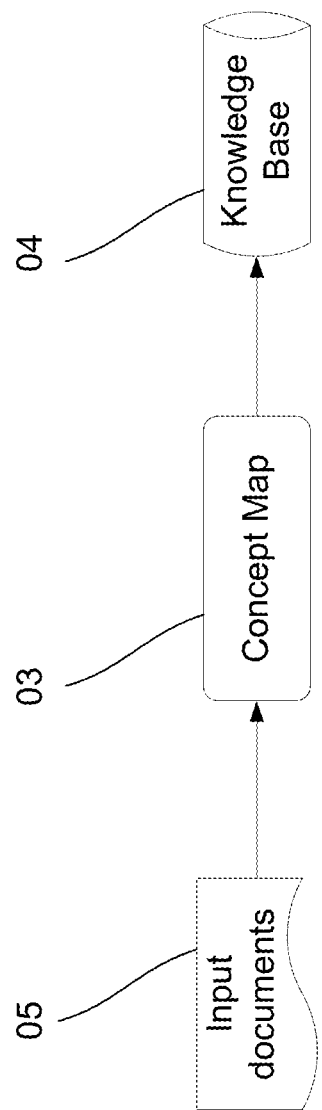
FIG. 8 is a flow chart illustrating Extracting Knowledge through Concept Map Only.

Referring to FIG. 8, it is possible to construct a knowledge base using only the concept maps 03. The input document is parsed using an NLP to RDF transformation. Subjects and objects in the RDF statements can then be mapped to concept types and the knowledge base populated accordingly. This is shown in more detail in the section "Function_4: Concept Map Processing".

Figure 9:
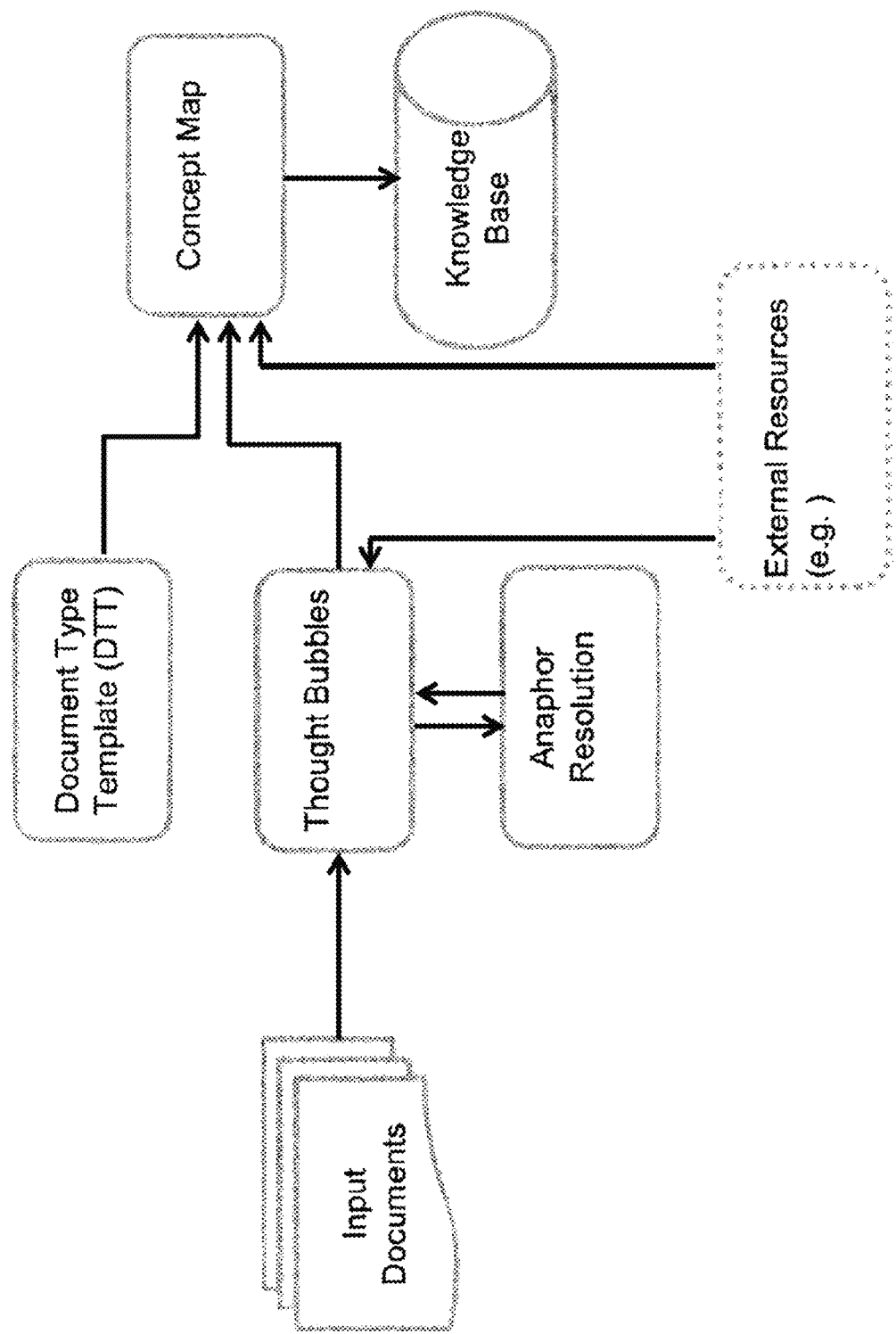
FIG. 9 is a flow chart illustrating Extracting Knowledge using all components.

Referring to FIG. 9, a scenario which optimises the concurrent use of the various components is shown.

FunctiorM: Document Type Definition (DTT) Processing
   Process Definition
   Input: Documents, potentially DTTs.
   Method: If DTT does not exist
      Manually create a new DTT
         Assistant Tool (incorporates NLP)
      DTT does exist (It either pre-existed, or was created)
         Determine which DTT to use
         Apply template
            Use NLP to determine mappings to template
            Determine individual Base URIs
            Determine individual Base Concepts
   Output: DTT, Abstract ontology (AO), Based URIs, Base Concepts
   End Function_2: Thought Bubbles (TB) Processing
   Process Definition
   Input: Documents, optionally Base URIs, Base Concepts
   Method: Error Reduction: for each document, errors such as compound sentences, incomplete sentences, etc., will be corrected.
      Extract Text: using NLP technique:
         Within a document paragraphs will be split.
         Within a paragraph sentences will be split.
         Within a sentence it performs a tokenisation, grammar tagging and produces a Penn tree.

Extract RDF components
    Within a Penn tree, we identify and derive subjects, predicates and objects.
    Using AI techniques and prepared training data, we perform a classification to extract the concepts/entities for subjects and objects.
    IF anaphor:
        Perform Function_3: Anaphor Resolution (RDF triples, Penn Tree)
    END IF
        Based URI, Subjects, predicates, objects and concepts are used to identify the concept maps and construct a set of RDF triples.
        Using External resources to enrich RDF triples.
    Output: RDF triples and concepts from Concept maps
End
Function_3: Anaphor Resolution
Process Definition
Input: RDF triples, Penn Tree, External Resources
Method: IF SBAR (clause introduced by a (possibly empty) subordinating conjunction—for example, if I see Matt at work, I'll invite him over this evening (->if)) leads the sentence and PRP appears following by THEN
        Cataphora is identified. Apply backward referencing
    IF PRP leads the sentence THEN
        Endophora is identified. Apply forward referencing
    IF WDT (determiner e.g. which, that, whatever, what, whichever) is found in the sentence THEN
        Exophora is identified. Apply situation referencing
Output: Updated Subjects and objects
End
Function_4: Concept Map Processing
Process Definition
Input: RDF triples, External Resource, concepts, Abstract Ontology
Method: Merge concepts in Abstract Ontology with concepts in Thought Bubbles
    IF predefined relationship not present THEN
        Query relationship from external resources using subjects and objects in RDF triples
        Link concepts based on extracted relationship
Output: New knowledge base
End Variations and Modifications Modifications and variations such as would be apparent to the skilled addressee are considered to fall within the scope of the present invention. The present invention is not to be limited in scope by any of the specific embodiments described herein. These embodiments are intended for the purpose of exemplification only. Functionally equivalent products, formulations and methods are clearly within the scope of the invention as described herein.

Reference to positional descriptions, such as lower and upper, are to be taken in context of the embodiments depicted in the figures, and are not to be taken as limiting the invention to the literal interpretation of the term but rather as would be understood by the skilled addressee.

Throughout this specification, unless the context requires otherwise, the word "comprise" or variations such as "comprises" or "comprising", will be understood to imply the inclusion of a stated integer or group of integers but not the exclusion of any other integer or group of integers.

Also, future patent applications maybe filed in Australia or overseas on the basis of, or claiming priority from, the present application. It is to be understood that the following provisional claims are provided by way of example only, and are not intended to limit the scope of what may be claimed in any such future application. Features may be added to or omitted from the provisional claims at a later date so as to further define or re-define the invention or inventions.

The invention claimed is:

1. A system for extracting information from a document using an electronic processing device, wherein the electronic processing device:
    identifies a document type of the document;
    uses a document type template that ontologically describes concepts and structures of documents of different document types to review the content of the document and identify structures within the document;
    references identified structures against a library of structures stored in a database to determine an ontological definition of the identified structures according to the conformance of the identified structures with those of the stored library of structures;
    obtains a vocabulary specific to the document type;
    reviews the content of the document using the vocabulary and the ontological definition of the identified structures to assign different regions of text a subject, an object and a predicate; and,
    for each different region, stores an assigned subject, object and predicate in a knowledge base.

2. A system for according to claim 1, wherein the different regions of the identified structures are referenced through Natural Language Processing.

3. A system according to claim 1, wherein when there is no conformance between the identified structures and the stored library of structures the system searches through documents in an external network for structures that match the identified structure.

4. A system according to claim 3, wherein:
    structures that match the identified structure are ontologically defined manually or using artificial intelligence; and,
    an ontological definition is stored in the stored library of structures.

5. The system as claimed in claim 1, wherein the template separates the text into the different regions.

6. The system as claimed in claim 5, wherein the different regions are at least one of sentences, paragraphs, thought bubbles, captions, chapter/section headings, figures, tables and Tweets.

7. The system as claimed in claim 6, wherein the subject, object and predicate are grouped in a resource description framework.

8. The system as claimed in claim 1, wherein the system reviews the text and assigns the different regions of the text a primary subject, a primary object and a primary predicate and stores the assignment as a resource description framework.

9. The system as claimed in claim 8, wherein the different regions of text are reviewed and further allocated at least one additional subject, at least one additional object and at least one additional predicate.

10. A system according to claim 1, wherein the electronic processing device:
    reviews the contents of the documents and identifies an expression of at least one concept within the document; and
    assigns the expression of the at least one concept a searchable resource description framework.

11. A system as claimed in claim 10, wherein the searchable resource description framework consists of a subject, predicate and object in a resource description framework triplet.

12. A system as claimed in claim 10, wherein a plurality of resource description framework triplets are associated with the contents of the document.

13. A system as claimed in claim 10, wherein if a non-specifically identifying subject, object or predicate is used within a first resource description framework an anaphora is applied to the surrounding resource description frameworks to identify the non-specifically identifying subject, object or predicate.

14. A system as claimed in claim 13, wherein if a subordinate conjunction appears first in the resource description framework followed by a personal pronoun and then a dependent clause, the system will associate the non-specifically identifying subject, object or predicate with the corresponding subject, object or predicate in the following resource description frameworks.

15. A system according to claim 1, wherein the electronic processing device:
  expresses contextual properties of the different regions as resource description framework units representative of a subject, an object and a predicate;
  arranges the resource description framework units so that the contextual properties can be referenced between two or more resource description framework units to generate arranged resource description framework units;
  performs anaphoric resolution between the arranged resource description framework units to generate one or more resource description framework units concepts from the resource description framework units; and
  stores the resource description framework concepts into concept maps based upon an ontology language for further processing.

16. A system according to claim 15, wherein the electronic processing device further stores the concept maps in a knowledge base.

17. The method of claim 15, wherein a resource description framework concept is either explicit or implicit and when the resource description framework concept is an implicit resource description framework concept, the electronic processing device further accesses external resources via the Internet to transform a resource description framework implicit concept into a resource description framework explicit concept.

18. A system according to claim 15, wherein the electronic processing device:
  merges base concepts and resource description framework concepts to form merged concepts wherein a merged concept is either explicit or implicit and when the merged concept is an implicit merged concept;
  accesses external resources via the Internet to transform an implicit merged concept into an explicit merged concept; and
  stores explicit merged concepts in knowledge base.

19. A system according to claim 15, wherein the electronic processing device:
  merges the defined structure and resource description framework concepts to form merged concepts wherein a merged concept is either explicit or implicit and when the merged concept is an implicit merged concept;
  accesses external resources via the Internet to transform an implicit merged concept into an explicit merged concept; and
  stores explicit merged concepts in knowledge base.

20. A system according to claim 19, wherein the electronic processing device queries the knowledge base to retrieve an explicit merged concept.

21. A system according to claim 15, wherein the contextual properties have a time element associated with them.

22. A system according to claim 15, wherein the time element is specific or extends over a period.

23. A system according to claim 1, wherein a measure of time is associated with the identified structure.

24. A system according to claim 1, wherein the document type template includes subtype templates for different structures.

25. A system according to claim 1, wherein the electronic processing device:
  determines relationships between different structures using linguistic referencing; and, reviews the content using the structures.

26. A system according to claim 1, wherein the relationships are at least one of:
  Endophora-Forward referencing;
  Cataphora-Backward referencing; and,
  Exophora-Situational referencing.

27. A system according to claim 1, wherein relationships are resolved at least in part by inheriting a subject, an object and a predicate from a different region.

* * * * *